UNITED STATES PATENT OFFICE.

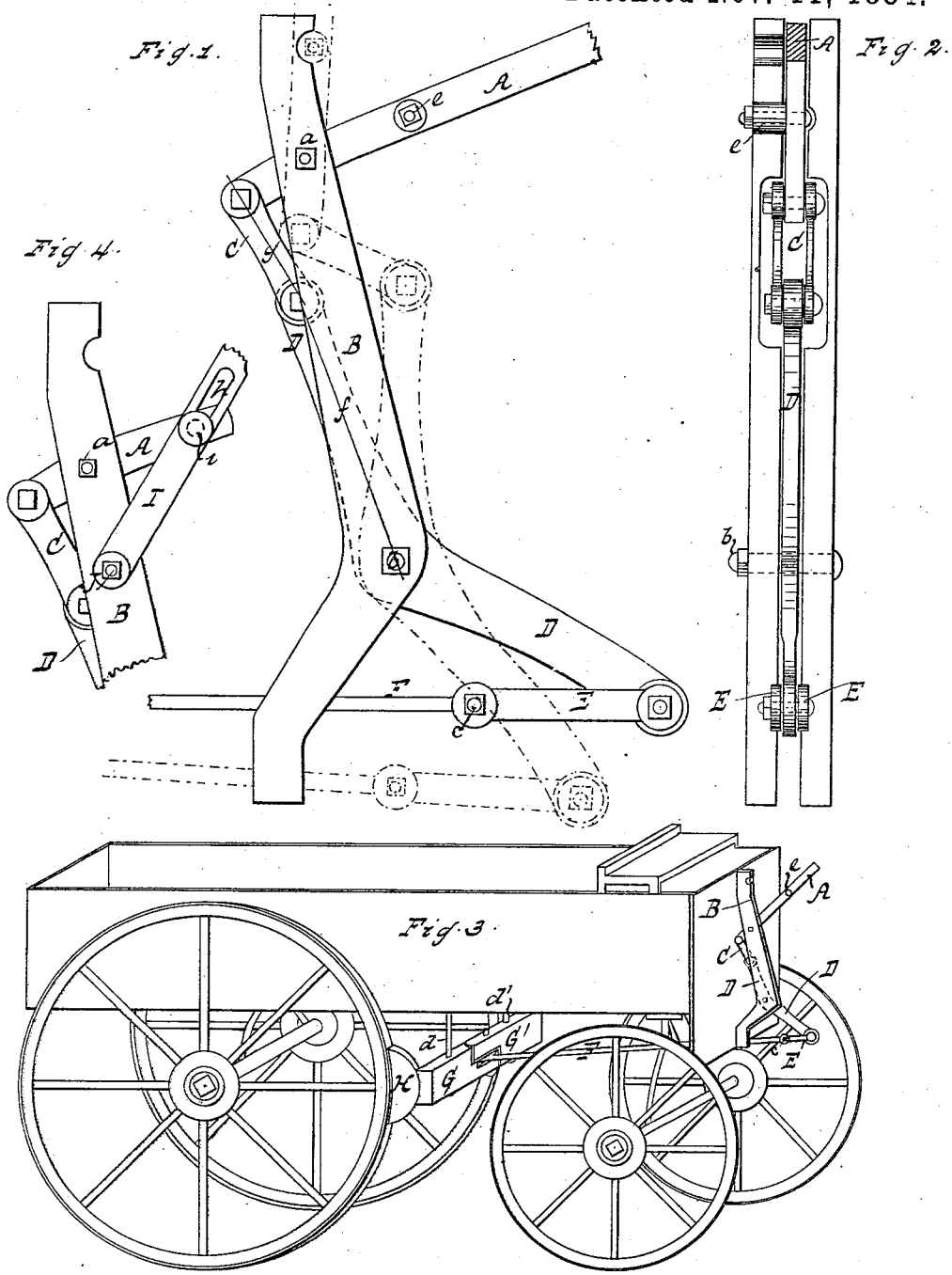

WILLIAM BENTHIN, OF FLUSHING, NEW YORK.

WAGON-BRAKE.

SPECIFICATION forming part of Letters Patent No. 307,903, dated November 11, 1884.

Application filed July 31, 1884. (No model.)

*To all whom it may concern:*

Be it known that I, WILLIAM BENTHIN, a citizen of the United States, residing at Flushing, in the county of Queens and State of New York, have invented new and useful Improvements in Wagon-Brakes, of which the following is a specification.

This invention relates to devices for operating the brake-heads of wagons and other vehicles; and it consists in a frame with levers and bars so arranged that when the brake is applied a minimum pressure only on the foot-lever is requisite to keep the brake in action.

In the accompanying drawings, Figure 1 is a side elevation of the device. Fig. 2 is a front elevation of the device. Fig. 3 is a perspective view showing the brake applied to a vehicle. Fig. 4 is a modification.

Similar letters indicate corresponding parts.

The letter A designates the foot-lever, pivoted by means of a pin or bolt, $a$, in the frame B, situated on the front end of the wagon. C C are toggle-levers, connected at one end with the foot-lever A, and on the other with the toggle-lever D. Said toggle-lever D is pivoted to the frame by the pivot $b$. On its lower end it connects with the levers E, which are connected by the pivot $c$ to the brake-rod F. The brake-rod F is pivoted, as shown in Fig. 3, to the brake-levers G G'. Said levers G G' are suspended from the wagon-bottom by bolts $d\ d'$, and swing about the same.

H H are the brake-heads, secured in the ends of the brake-levers G G'.

$e$ is a block secured to the foot-lever A, and bearing (when the same is in the position shown in dotted lines) against the frame B.

In the drawings the device is shown with the brake pressed against the wheel. When in said position, the axes $f\ g$ of the toggle-levers C D are nearly in the same straight line, by which means a minimum pressure on the foot-lever A will keep the brake pressed against the wheel.

The dotted lines, Fig. 1, show the position of the levers when the brake-head G is removed from the wheel by means of the foot-lever A being raised. It is not necessary that the foot-lever A be raised as far as shown by the dotted lines in Fig. 1, only enough motion being required to remove the brake-head H from the wheel.

Fig. 4 is a modification of this device, in which, instead of using the lever A as a foot-lever, the same is shortened and connected with a foot-lever, I, containing a slot, $h$, which slot $h$ engages a pin, $i$, on the lever A. The other end of the foot-lever I is pivoted to the frame at $j$. The brake-head H is then operated by the lever I, used as a foot-lever.

What I claim as new, and desire to secure by Letters Patent, is—

The combination, substantially as herein shown and described, with a frame, B, and a foot-lever, A, of toggle-levers C D and the connection of said toggle-levers C D with the brake-head H, said toggle-levers C D being so arranged that when the brake is applied the axes $f\ g$ of the toggle-levers C D are nearly in a straight line, thus requiring a minimum amount of pressure on the foot-lever A to keep the brakes H on the wheels.

In testimony whereof I have hereunto set my hand and seal in the presence of two subscribing witnesses.

WILLIAM BENTHIN. [L. S.]

Witnesses:
E. F. KASTENHUBER,
A. FABER DU FAUR, Jr.